Aug. 15, 1933.  W. F. FOUQUET  1,922,537
ADJUSTABLE MOUNT FOR PROJECTING LENSES
Filed Sept. 5, 1929
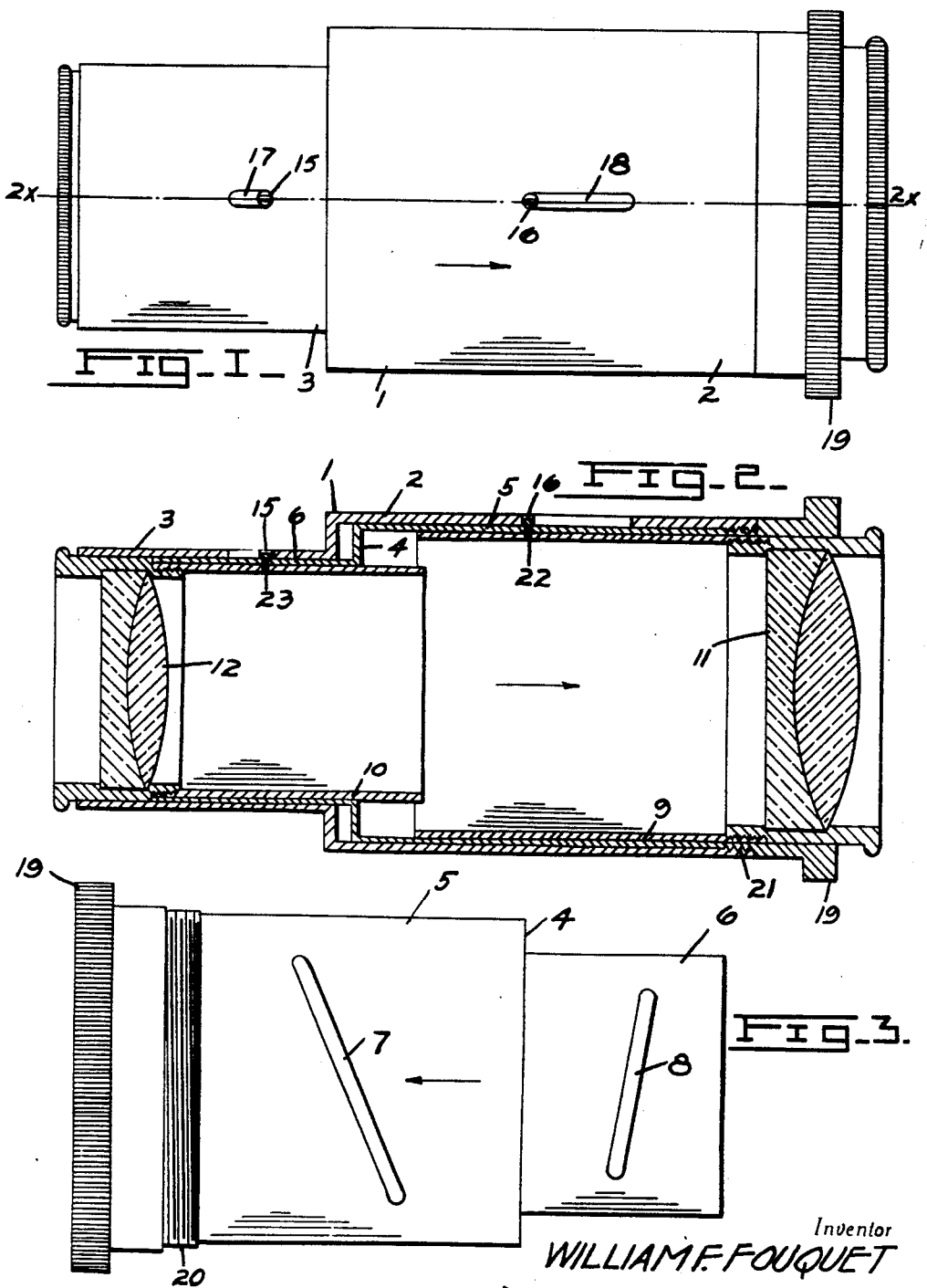
Inventor
WILLIAM F. FOUQUET
By Frank Keifer
Attorney Patented Aug. 15, 1933

1,922,537

UNITED STATES PATENT OFFICE 1,922,537

ADJUSTABLE MOUNT FOR PROJECTING LENSES

William F. Fouquet, Rochester, N. Y., assignor to Projection Optics Co., Rochester, N. Y.

Application September 5, 1929. Serial No. 390,547

2 Claims. (Cl. 88—24)

The object of this invention is to provide a new and improved mount for projecting lenses.

Another object of the invention is to make the mount adjustable so as to vary the magnifying power of the lenses of the optical combination so as to form on the screen an image picture of constant size with negatives of different sizes without disturbing the focus.

Another object is to provide this adjustment so that the lenses can be moved closer together or spaced further apart without removing the lenses from the projection apparatus or without otherwise interfering with or delaying the showing of pictures through the lenses.

Another object is to adjust the lenses with reference to a fixed theoretical plane without disturbing the position of this plane, which plane is called a principal plane.

Another object is to move the lenses away from or toward the principal plane simultaneously in a single operation at fixed unequal rates without disturbing the focus of the picture on the screen.

These and other objects of the invention will be illustrated in the drawing, described in the specification and pointed out in the claims at the end thereof.

In the drawing:

Figure 1 is a side elevation of my improved lens mount.

Figure 2 is a vertical section on the line $2x$, $2x$ of Figure 1.

Figure 3 is a side elevation of the sleeve having cams therein by which the lenses are moved toward or away from each other without changing the principal plane between the lenses.

In the drawing like reference numerals indicate like parts.

In the drawing reference numeral 1 indicates a stationary sleeve composed of two cylinders 2 and 3 suitably joined together so that they will act in unison. Inside of this sleeve 1 is a cam sleeve 4 which makes a working fit therewith which sleeve is composed of the cylinders 5 and 6 which act together. In the cylinder 6 is cut the cam slot 8 of a small pitch and in the cylinder 5 is cut the cam slot 7 of a big pitch.

Inside of the cam sleeve 4 are the sleeves 9 and 10. The sleeve 9 carries a doublet lens 11 having a large diameter and the sleeve 10 carries the doublet lens 12 having a smaller diameter. These lenses are substantially the same as is shown in the patent to Repp, No. 1,479,251 and are used in moving picture machines and stereopticans for the purpose of throwing a large image on the screen from a small negative in the machine. The sleeve 10 is provided with a screw 15 threaded therein, and the sleeve 9 is provided with a screw 16 threaded therein. The screw 15 engages with the short longitudinal slot 17 shown in Figure 1, and the screw 16 engages with the long longitudinal slot 18 shown in Figure 1. Both of these slots are cut in the sleeve 1. The screw 15 passes through the cam slot 8 shown in Figure 3 and the screw 16 passes through the cam slot 7 shown in Figure 3 both of which slots are cut in the sleeve 4.

It will be understood that the sleeve 4 shown in Figure 3 is reversed end to end from the position shown in Figures 1 and 2 merely to accommodate it and place it to better advantage on the drawing.

The sleeve 4 has an enlarged flange 19 on the end thereof which serves as a handle by which it is turned. The sleeve 4 is threaded at 20 with a male thread and the sleeve 1 is threaded at 21 with a female thread. The sleeve 4 is inserted in the sleeve 1 until the threads engage, and the male thread is then screwed into the female thread until the two sleeves are securely held together. The slots 17 and 18 are then brought into register with the respective cam slots 8 and 7. The sleeves 9 and 10 bearing the lenses are then inserted and placed so that the screw holes therein are in line with the intersection of the slots above named. The screw hole 22 of the sleeve 9 is placed in line with the intersection of the slots 7 and 18 and the screw hole 23 of the sleeve 10 is placed in line with the intersection of the slots 8 and 17. The screws 15 and 16 are then inserted so as to engage the sleeves 10 and 9 with their threads and so as to engage the intersecting slots with their heads.

It will be seen that the angular pitch of the cam 7 is about three times the angular pitch of the slots 8. When the sleeve 4 is turned by the handle 19 the lens assembly 11 is moved longitudinally three times as fast as is the lens assembly 12. The slot 18 is correspondingly longer than the slot 17 so as to permit this difference in longitudinal movement and both slots stop the movement at the proper limit both in the outward and inward movement of the lenses.

It will also be understood that when the flange 19 and its sleeve 4 is turned in the sleeve 1 it turns nearly a quarter turn, the sleeve 4 moves out of the sleeve 1 a distance of less than .01" due to the threaded engagement between the two sleeves. This longitudinal movement of the one sleeve on the other is not sufficient to cause any perceptible error and it may be compensated for in the shape of the cams.

In adjusting the lenses the operator takes hold of the sleeve 1 with one hand and with the handle 19 in the other hand and turns them in opposite directions while the assembly is in position in the projection apparatus and the lenses are moved apart or together thereby changing the magnifying power of the optical system for the purpose of controlling the size of the image picture on the screen.

The further apart the lenses are spaced the smaller will be the image picture on the screen. The nearer together the lenses are brought the larger will be the image picture on the screen. In this way the lens can be accommodated to change the size of the picture on the screen within certain limits at will.

In the so-called movie-tone film, a film of standard width is used, the width of which is the same as the motion picture film of the old type or silent film which is not used for sound reproduction. In the movie-tone film a part of the film is used for sound reproduction and the space allotted to the negative of the picture is correspondingly reduced or made smaller. With the same setting of the lenses the smaller negatives of the movie-tone film will throw a correspondingly smaller picture on the screen than will the larger negative of the silent film.

A movie-tone film sometimes follows a silent film that is not movie-tone. If the lenses of the projection apparatus are set to make the picture that is not movie-tone cover the screen then with the same setting of lenses the movie-tone film will throw a smaller picture that will not fill the screen. In such case the operator can turn the sleeves 1 and 4 with reference to each other and the lenses will be brought closer together thereby so that a larger picture will be thrown on the screen and the picture on the screen of the movie-tone film will in this way be magnified or made just as large and will fill the screen just as fully as does the picture from the silent film that is not movie-tone. That is, the smaller negative in the film of the movie-tone will throw as large a picture on the screen as did the larger negative of the silent film that is not movie-tone.

This adjustment of the distance between the lenses to compensate for the difference in the sizes of the negatives can be made quickly by the operator without interferring with the continuous operation of the machine and the continuous projection of the picture on the screen. It will be understood that the assembly as a whole can be adjusted back and forth to focus the image picture on the screen by the usual apparatus, but after the focus is once obtained by the rack and pinion the rack and pinion adjustment need not be further disturbed when the magnifying power of the lenses is changed by the mount of my invention.

It will be understood that this lense assembly is placed between the film and the screen and the light goes through it from the film to the screen in the direction indicated by the arrow.

It will also be understood that the positions of the film and the screen are both fixed and the adjustment must be confined to the lens assembly.

It will also be understood that the same result could be secured by keeping one lens stationary and moving the other lens out or in with reference thereto and then moving the assembly as a whole forward or back with the rack and pinion, but all this would interrupt the focusing and showing of the picture on the screen and would take considerable time. In my invention the showing of the picture is not interrupted, and the picture on the screen is kept continually in focus, and the change from smaller size to the larger size picture on the screen or vice versa can be made by the operator in a few seconds using just one hand by turning the knurled flange 19.

I claim:

1. A lens mount having a short sleeve at each end thereof, a lens in each of said sleeves, each of said sleeves and each lens being of different diameter from the other sleeve and its lens, two long concentric sleeves in which said short lens sleeves are mounted, each of said long sleeves having a small diameter at one end and a larger diameter at the other end to correspond with the diameters of the short sleeves, an annular shoulder in each of said long sleeves connecting the two diameters thereof, one of said concentric sleeves having a right and left hand cam slot therein, the right hand cam slot being in the portion of the concentric sleeve having the one diameter, and the left hand cam slot being in the portion of the concentric sleeve having the other diameter, the said slots being balanced against each other and at different angles, the other concentric sleeve having longitudinal slots therein, a screw in each of said short sleeves adapted to engage one of the cam slots and one of the longitudinal slots in the concentric sleeves above mentioned whereby on the turning of one of the concentric sleeves in the outer sleeve, the short sleeves and their lenses are moved apart or together for the purpose of varying the magnifying power of the lenses.

2. A lens mount having a short sleeve at each end thereof, a lens in each of said sleeves, each of said sleeves and each lens being of different diameter from the other sleeve and its lens, two long concentric sleeves in which said short lens sleeves are mounted, each of said long sleeves having a small diameter at one end and a larger diameter at the other end to correspond with the diameters of the short sleeves, an annular shoulder in each of said long sleeves connecting the two diameters thereof, one of said concentric sleeves having a right and left hand cam slot therein, the right hand cam slot being in the portion of the concentric sleeve having the one diameter, and the left hand cam slot being in the portion of the concentric sleeve having the other diameter, the said slots being balanced against each other and at different angles, the other concentric sleeve having longitudinal slots therein, a screw in each of said short sleeves adapted to engage one of the cam slots and one of the longitudinal slots in the concentric sleeves above mentioned whereby on the turning of the one concentric sleeve in the other sleeve, the short sleeves and their lenses are moved apart or together for the purpose of varying the magnifying power of the lenses, means for holding the two concentric sleeves together and permit the one to turn on the other.

WILLIAM F. FOUQUET.